United States Patent
Fan

(10) Patent No.: US 10,250,728 B2
(45) Date of Patent: *Apr. 2, 2019

(54) COLOR-VARIABLE TERMINAL

(71) Applicant: Huawei Technologies Co., Ltd., Shenzhen (CN)

(72) Inventor: Wenxing Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

This patent is subject to a terminal disclaimer.

(21) Appl. No.: 15/961,527

(22) Filed: Apr. 24, 2018

(65) Prior Publication Data
US 2018/0241858 A1     Aug. 23, 2018

Related U.S. Application Data

(63) Continuation of application No. 15/518,974, filed as application No. PCT/CN2014/088535 on Oct. 14, 2014, now Pat. No. 9,986,074.

(51) Int. Cl.
*H04M 1/00* (2006.01)
*H04M 1/02* (2006.01)
(Continued)

(52) U.S. Cl.
CPC .......... *H04M 1/0266* (2013.01); *G06F 3/041* (2013.01); *G09G 3/3648* (2013.01);
(Continued)

(58) Field of Classification Search
None
See application file for complete search history.

(56) References Cited

U.S. PATENT DOCUMENTS 5,920,364 A     7/1999   Akins et al.
6,845,140 B2 *  1/2005   Moon ................. G09G 3/3685
                                                     345/100
(Continued)

FOREIGN PATENT DOCUMENTS

CN     202584078 U    12/2012
CN     103312844 A     9/2013
(Continued)

OTHER PUBLICATIONS

Machine Translation and Abstract of Chinese Publication No. CN103970329, Aug. 6, 2014, 13 pages.
(Continued)

*Primary Examiner* — Tuan A Tran
(74) *Attorney, Agent, or Firm* — Conley Rose, P.C.

(57) ABSTRACT

A color-variable terminal includes a touchscreen, a display screen, a circuit board, and a liquid crystal light adjustment film. The touchscreen is located above the display screen. The circuit board is located below the display screen, and the circuit board includes a drive circuit. The liquid crystal light adjustment film is disposed on the touchscreen. The drive circuit is configured to apply a control voltage to the liquid crystal light adjustment film. The liquid crystal light adjustment film is in a transparent state when an amplitude of the control voltage is greater than or equal to a preset threshold, or the liquid crystal light adjustment film is in a nontransparent state when an amplitude of the control voltage is less than the preset threshold, and a color of the liquid crystal light adjustment film in the non-transparent state is different from a color of the display screen.

20 Claims, 13 Drawing Sheets

(51) Int. Cl.
*G06F 3/041* (2006.01)
*G09G 3/36* (2006.01)

(52) U.S. Cl.
CPC ............... *G09G 2310/0289* (2013.01); *G09G 2320/0242* (2013.01); *H04M 1/0283* (2013.01)

(56) References Cited

U.S. PATENT DOCUMENTS

| | | | | |
|---|---|---|---|---|
| 7,304,627 | B2* | 12/2007 | Kim | G09G 3/3651 345/97 |
| 7,499,121 | B2* | 3/2009 | Noguchi | G02F 1/13454 349/110 |
| 8,363,301 | B2* | 1/2013 | Lee | E06B 9/24 359/265 |
| 8,385,980 | B2* | 2/2013 | Causey | H04M 1/0283 455/566 |
| 8,493,364 | B2 | 7/2013 | Charlier et al. | |
| 8,558,959 | B2* | 10/2013 | Inoue | G02F 1/1337 349/129 |
| 9,032,292 | B2* | 5/2015 | Lavallee | G06F 9/543 178/18.01 |
| 9,116,379 | B2* | 8/2015 | Braganza | G02F 1/13718 |
| 9,142,595 | B2* | 9/2015 | Hamer | H01L 27/3209 |
| 9,235,075 | B2* | 1/2016 | Montbach | G02F 1/13718 |
| 9,237,211 | B2* | 1/2016 | Tabe | H04M 1/00 |
| 9,671,545 | B2* | 6/2017 | Huang | G02B 6/0036 |
| 2003/0080947 | A1* | 5/2003 | Genest | G06F 1/1626 345/173 |
| 2003/0147527 | A1 | 8/2003 | Mulligan et al. | |
| 2003/0160741 | A1* | 8/2003 | Martinez | G06F 1/1613 345/49 |
| 2011/0164047 | A1* | 7/2011 | Pance | G06F 1/1647 345/581 |
| 2011/0254780 | A1 | 10/2011 | Kim et al. | |
| 2014/0063372 | A1 | 3/2014 | Yu et al. | |
| 2016/0109779 | A1 | 4/2016 | Ke et al. | |

FOREIGN PATENT DOCUMENTS

| | | |
|---|---|---|
| CN | 103970329 A | 8/2014 |
| EP | 0564127 A2 | 10/1993 |
| EP | 1467536 A1 | 10/2004 |
| JP | H0669992 A | 3/1994 |
| JP | 2001318374 A | 11/2001 |
| JP | 5324122 B2 | 10/2013 |
| KR | 101109313 B1 | 1/2012 |
| WO | 2008123442 A1 | 10/2008 |
| WO | 2014036898 A1 | 3/2014 |

OTHER PUBLICATIONS

Machine Translation and Abstract of Chinese Publication No. CN202584078, Dec. 5, 2012, 7 pages.
Foreign Communication From a Counterpart Application, Korean Application No. 10-2017-7012590, Korean Office Action dated May 18, 2018, 5 pages.
Foreign Communication From a Counterpart Application, Korean Application No. 10-2017-7012590, English Translation of Korean Office Action dated May 18, 2018, 3 pages.
Foreign Communication From a Counterpart Application, Chinese Application No. 201480001788.6, Chinese Office Action dated Jun. 29, 2016, 7 pages.
Foreign Communication From a Counterpart Application, European Application No. 14904187.3, Extended European Search Report dated Nov. 27, 2017, 8 pages.
Foreign Communication From a Counterpart Application, PCT Application No. PCT/CN2014/088535, English Translation of International Search Report dated Jun. 18, 2015, 2 pages.
Foreign Communication From a Counterpart Application, PCT Application No. PCT/CN2014/088535, English Translation of Written Opinion dated Jun. 18, 2015, 11 pages.
Machine Translation and Abstract of Japanese Publication No. JP5324122, Oct. 23, 2013, 10 pages.
Machine Translation and Abstract of Japanese Publication No. JP2001318374, Nov. 16, 2001, 91 pages.
Machine Translation and Abstract of International Publication No. WO2008123442, Oct. 16, 2008, 9 pages.
Foreign Communication From a Counterpart Application, Japanese Application No. 2017-519812, Japanese Office Action dated Jun. 19, 2018, 3 pages.
Foreign Communication From a Counterpart Application, Japanese Application No. 2017-519812, English Translation of Japanese Office Action dated Jun. 19, 2018, 3 pages.

* cited by examiner

COLOR-VARIABLE TERMINAL

CROSS-REFERENCE TO RELATED APPLICATIONS

This application is a continuation of U.S. patent application Ser. No. 15/518,974 filed on Apr. 13, 2017, which is a continuation of International Patent Application No. PCT/CN2014/088535 filed on Oct. 14, 2014. Both of the aforementioned patent applications are hereby incorporated by reference in their entireties.

TECHNICAL FIELD

The present disclosure relates to communications technologies, and in particular, to a color-variable terminal.

BACKGROUND

Regarding current design of terminals such as a mobile phone and an IPAD, in addition to having a specific requirement on product quality of the terminals, some users pay increasing attention to color design of the terminals. Therefore, in addition to improving product quality of the terminals, terminal manufacturers increasingly focus on color design of the terminals. A white mobile phone is used as an example. Appearances of a display screen, a front-facing camera, and a light sensing device are black, and other display areas are white. An appearance of the body of the entire mobile phone is also black and white when the mobile phone is standby or powered off. However, appearance design of the current terminals still cannot meet terminal appearance requirements of some users.

SUMMARY

Embodiments of the present disclosure provide a color-variable terminal in order to resolve a problem that terminal appearance requirements of some users are not met in other approaches. According to a first aspect, an embodiment of the present disclosure provides a color-variable terminal, where the terminal includes a touchscreen, a display screen, a circuit board, and a liquid crystal light adjustment film, where the touchscreen is located above the display screen. The circuit board is located below the display screen, and the circuit board includes a drive circuit. The liquid crystal light adjustment film is disposed on the touchscreen, where the drive circuit is configured to apply a control voltage to the liquid crystal light adjustment film. The liquid crystal light adjustment film is in a transparent state when an amplitude of the control voltage is greater than or equal to a preset threshold, or the liquid crystal light adjustment film is in a non-transparent state when an amplitude of the control voltage is less than the preset threshold, and a color of the liquid crystal light adjustment film in the non-transparent state is different from a color of the display screen.

With reference to the first aspect, in a first possible implementation manner of the first aspect, the touchscreen includes a glass cover and a touch function layer, and the liquid crystal light adjustment film disposed on the touchscreen is disposed on an upper surface of the glass cover, on a lower surface of the touch function layer, or between the glass cover and the touch function layer.

With reference to the first aspect or the first possible implementation manner of the first aspect, in a second possible implementation manner of the first aspect, the drive circuit includes a first drive circuit, and the liquid crystal light adjustment film includes a first area, where the first area matches the display screen, and the first drive circuit is configured to apply a control voltage to the first area. The circuit board further includes a central processing unit, where the central processing unit is configured to detect whether the display screen is off. The central processing unit is further configured to control the first drive circuit to apply, to the first area, a control voltage whose amplitude is less than the preset threshold when it is detected that the display screen is off, where the control voltage whose amplitude is less than the preset threshold enables the first area to be in a non-transparent state, and control the first drive circuit to apply, to the first area, a control voltage whose amplitude is greater than or equal to the preset threshold when it is detected that the display screen is on, where the control voltage whose amplitude is greater than or equal to the preset threshold enables the first area to be in a transparent state.

With reference to the second possible implementation manner of the first aspect, in a third possible implementation manner of the first aspect, the terminal further includes a front-facing camera, where the front-facing camera is disposed on the circuit board. The drive circuit further includes a second drive circuit, and the liquid crystal light adjustment film further includes a second area, where the second area matches the front-facing camera, and the second drive circuit is configured to apply a control voltage to the second area. The central processing unit is further configured to receive an instruction used to turn on the front-facing camera, and control the second drive circuit to apply, to the second area, a control voltage whose amplitude is greater than or equal to the preset threshold after it is detected that the display screen is on, where the control voltage whose amplitude is greater than or equal to the preset threshold enables the second area to be in a transparent state, and control the second drive circuit to apply, to the second area, a control voltage whose amplitude is less than the preset threshold when no instruction used to turn on the front-facing camera is detected, where the control voltage whose amplitude is less than the preset threshold enables the second area to be in a non-transparent state.

With reference to the second possible implementation manner of the first aspect or the third possible implementation manner of the first aspect, in a fourth possible implementation manner of the first aspect, the terminal further includes a light sensor, where the light sensor is disposed on the circuit board. The drive circuit further includes a third drive circuit, and the liquid crystal light adjustment film further includes a third area, where the third area matches the light sensor, and the third drive circuit is configured to apply a control voltage to the third area. The central processing unit is further configured to receive an instruction used to turn on the light sensor, and control the third drive circuit to apply, to the third area, a control voltage whose amplitude is greater than or equal to the preset threshold after it is detected that the display screen is on, where the control voltage whose amplitude is greater than or equal to the preset threshold enables the third area to be in a transparent state, and control the third drive circuit to apply, to the third area, a control voltage whose amplitude is less than the preset threshold when no instruction used to turn on the light sensor is detected, where the control voltage whose amplitude is less than the preset threshold enables the third area to be in a non-transparent state.

With reference to the first aspect or the first possible implementation manner of the first aspect, in a fifth possible implementation manner of the first aspect, the terminal further includes a switch configured to receive user input in order to generate a control signal that is used to turn on or turn off the display screen, and the circuit board further includes a fourth drive circuit configured to control, according to the control signal generated by the switch, the display screen to turn on or turn off, where the fourth drive circuit is electrically connected to the switch. The fourth drive circuit applies, to the liquid crystal light adjustment film, a control voltage whose amplitude is greater than or equal to the preset threshold when the switch generates a control signal that is used to control the display screen to turn on, and the fourth drive circuit applies, to the liquid crystal light adjustment film, a control voltage whose amplitude is less than the preset threshold when the switch generates a control signal that is used to control the display screen to turn off.

According to a second aspect, an embodiment of the present disclosure provides a color-variable terminal, where the terminal includes a housing, where the housing is partially or entirely transparent, a circuit board, where the circuit board is located inside the housing, and the circuit board includes a drive circuit, a liquid crystal light adjustment film, where the liquid crystal light adjustment film is located inside the housing and covers a transparent area of the housing, and a coating, where the coating is located inside the housing, and the coating and the transparent area of the housing are respectively located on two sides of the liquid crystal light adjustment film, where the drive circuit is configured to apply a control voltage to the liquid crystal light adjustment film. The liquid crystal light adjustment film is in a transparent state when an amplitude of the control voltage is greater than or equal to a preset threshold, or the liquid crystal light adjustment film is in a non-transparent state when an amplitude of the control voltage is less than the preset threshold, and a color of the liquid crystal light adjustment film in the non-transparent state is different from a color of the coating.

With reference to the second aspect, in a first possible implementation manner of the second aspect, the terminal further includes a display screen, and the circuit board further includes a central processing unit.

With reference to the first possible implementation manner of the second aspect, in a second possible implementation manner of the second aspect, when the central processing unit detects that the display screen is off, the central processing unit controls the drive circuit to apply, to the liquid crystal light adjustment film, a control voltage whose amplitude is less than the preset threshold, where the control voltage whose amplitude is less than the preset threshold enables the liquid crystal light adjustment film to be in the non-transparent state.

With reference to the first possible implementation manner of the second aspect or the second possible implementation manner of the second aspect, in a third possible implementation manner of the second aspect, when the central processing unit detects that the display screen is on, the central processing unit control the drive circuit to apply, to the liquid crystal light adjustment film, a control voltage whose amplitude is greater than or equal to the preset threshold, where the control voltage whose amplitude is greater than or equal to the preset threshold enables the liquid crystal light adjustment film to be in the transparent state.

With reference to the first possible implementation manner of the second aspect, in a fourth possible implementation manner of the second aspect, the central processing unit is further configured to receive an input instruction of a user, and control, according to the received input instruction, the drive circuit to apply a control voltage to the liquid crystal light adjustment film.

According to the color-variable terminal provided in the embodiments of the present disclosure, a liquid crystal light adjustment film matching a touchscreen is disposed on the touchscreen. A drive circuit applies a control voltage to the liquid crystal light adjustment film, and the liquid crystal light adjustment film is in a transparent state when an amplitude of the applied control voltage is greater than or equal to a preset threshold, or the liquid crystal light adjustment film is in a non-transparent state when an amplitude of the applied control voltage is less than the preset threshold. Therefore, when a display screen of the terminal is not working, an appearance color of the display screen is different from that of a display screen that is not working in other approaches, thereby meeting a terminal appearance requirement of a user and improving visual experience of the user.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

Figure 1:
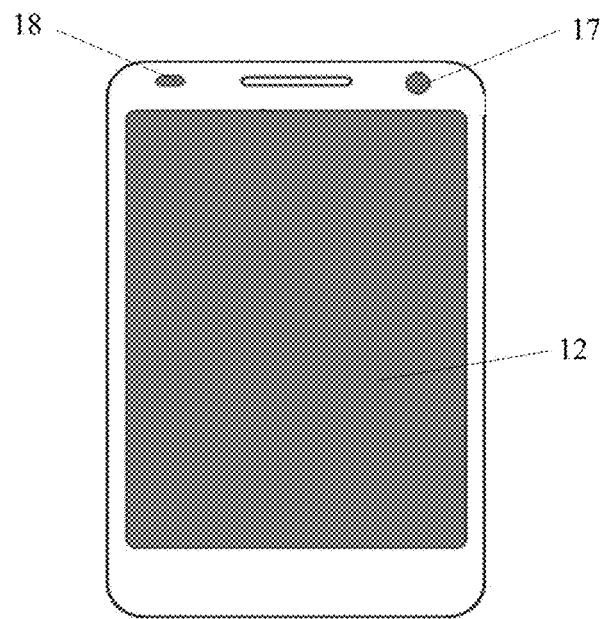
FIG. 1 is a schematic structural diagram of a white mobile phone according to the present disclosure.

DESCRIPTION OF REFERENCE NUMERALS
IN THE ACCOMPANYING DRAWINGS

11: Touchscreen;
12: Display screen;
13: Circuit board;
14: Liquid crystal light adjustment film;
15: Drive circuit;
111: Glass cover;
112: Touch function layer;
151: First drive circuit;
152: Second drive circuit;
153: Third drive circuit;
141: First area;
142: Second area;
143: Third area;
16: Central processing unit;
17: Front-facing camera;
18: Light sensor;
19: Switch;
154: Fourth drive circuit;
21: First transparent film;
22: Second transparent film;
23: ITO film;
24: Liquid crystal layer;
25: Third transparent film layer;
26: Fourth transparent film;
30: Housing; and
31: Coating.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

A terminal to which the embodiments of the present disclosure relate, that is, user equipment, may be a wireless terminal or may be a wired terminal. The wireless terminal may be a device that provides a user with connectivity for at least one of voice or data, a handheld device that has a wireless connection function, or another processing device that is connected to a wireless modem. The wireless terminal may be a mobile terminal, for example, may be a portable, pocket, handheld, computer built-in, or in-vehicle mobile apparatus, which exchanges at least one of voice or data with a radio access network. The foregoing terminal may be a mobile phone, or may be a portable computer of a user, or the like. It should be noted that the embodiments of the present disclosure impose no limitation on a color of a housing of the terminal. Preferably, a color of a part of the housing of the terminal may be white, and another part may be of another color. For example, a color of a front housing area of a mobile phone may be white, and a color of a rear housing of the terminal and a color of a side surface of a part connecting the front housing and the rear housing may be white, or may be another color. Reference may be made to a white mobile phone shown in FIG. 1. For ease of description of the technical solutions in this application, a white mobile phone is used as an example in all subsequent embodiments of the present disclosure.

When an existing terminal such as, the white mobile phone shown in FIG. 1 is standby, a display screen 12, a front-facing camera 17, and a light sensor 18 are all black, and another display area of a front housing is white. Consequently, for some users that have a high requirement on the color, visual experience is degraded.

Figure 2:
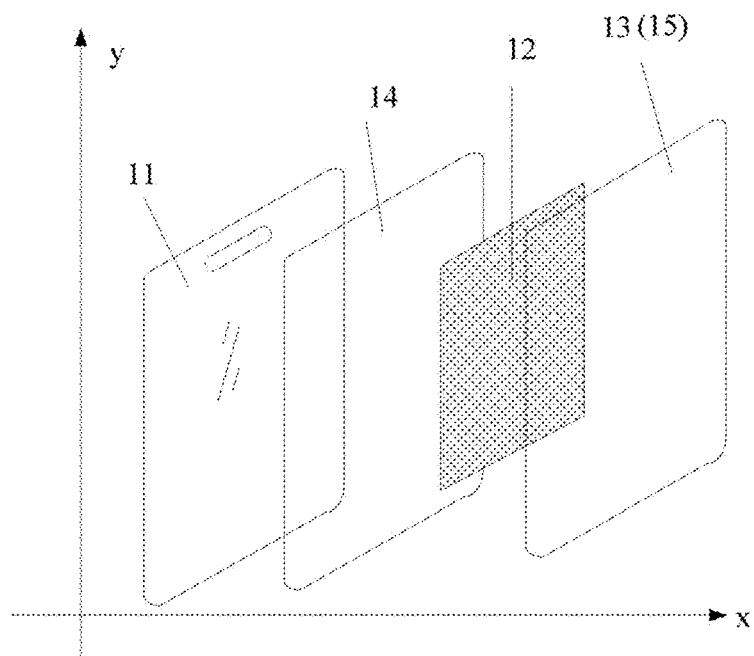
FIG. 2 is a schematic structural diagram of a color-variable terminal according to the present disclosure.

FIG. 2 is a schematic structural diagram of a color-variable terminal according to the present disclosure. The terminal includes a touchscreen 11, a display screen 12, a circuit board 13, and a liquid crystal light adjustment film 14. The touchscreen 11 is located above the display screen 12. The circuit board 13 is located below the display screen 12, and the circuit board 13 includes a drive circuit 15. The liquid crystal light adjustment film 14 is disposed on the touchscreen 11. The drive circuit 15 is configured to apply a control voltage to the liquid crystal light adjustment film 14. The liquid crystal light adjustment film 14 is in a transparent state when an amplitude of the control voltage is greater than or equal to a preset threshold, or the liquid crystal light adjustment film 14 is in a non-transparent state when an amplitude of the control voltage is less than the preset threshold, and a color of the liquid crystal light adjustment film 14 in the non-transparent state is different from a color of the display screen 12.

Further, as shown in FIG. 2, the touchscreen 11 is located above the display screen 12, and the circuit board 13 is located below the display screen 12. The terms "above" and "below" herein may be defined according to a coordinate system shown in FIG. 2. A coordinate value of the touchscreen 11 on the x axis is less than a coordinate value of the display screen 12 on the x axis, which indicates that the touchscreen 11 is located above the display screen 12. A coordinate value of the circuit board 13 on the x axis is greater than the coordinate value of the display screen 12 on the x axis, which indicates that the circuit board 13 is located below the display screen 12. In addition, the concepts "upper" and "lower" involved in the present disclosure may be defined according to the coordinate system shown in FIG. 2.

Figure 3:
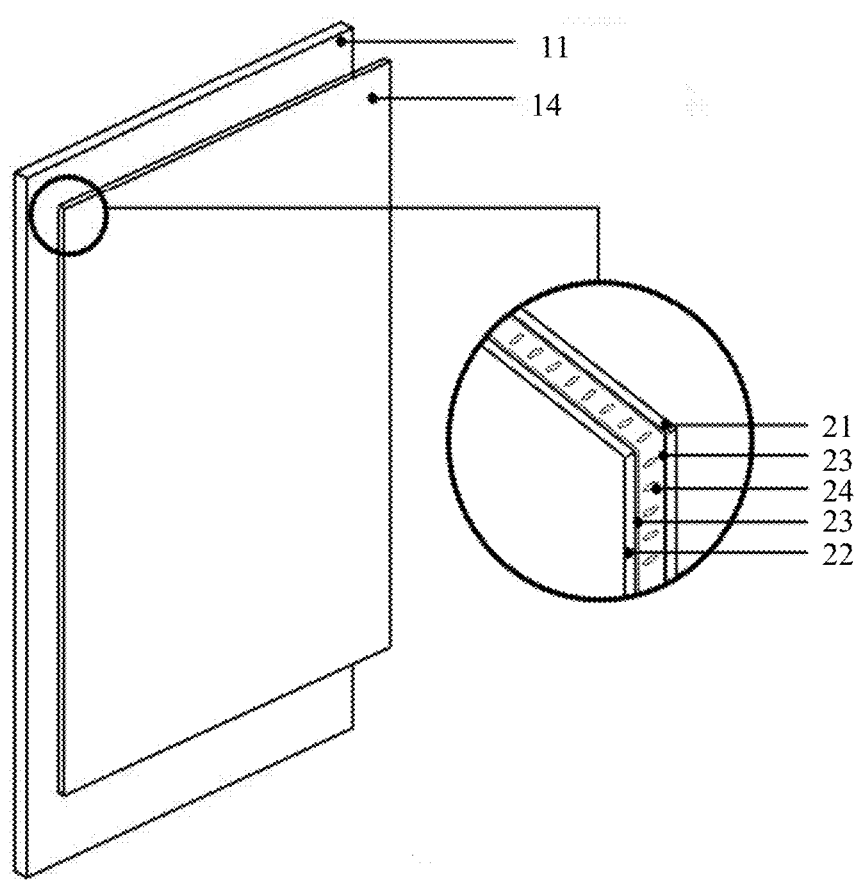
FIG. 3 is a schematic structural diagram of a liquid crystal light adjustment film according to the present disclosure.

In the embodiment of the present disclosure, the liquid crystal light adjustment film 14 is disposed on the touchscreen 11. It should be noted that, in FIG. 2, the liquid crystal light adjustment film 14 is shown as a separate layer in order to display the liquid crystal light adjustment film 14 more clearly, which is merely used as an example in this embodiment of the present disclosure. In this embodiment of the present disclosure, a position of the liquid crystal light adjustment film 14 is not limited to the position shown in FIG. 2, provided that the liquid crystal light adjustment film 14 matches the touchscreen 11. For a structure of the liquid crystal light adjustment film 14, reference may be made to FIG. 3. The liquid crystal light adjustment film 14 may include a first transparent film 21 and a second transparent film 22, a layer of indium tin oxide (ITO) film 23 is sputtered on two opposite surfaces of the first transparent film 21 and the second transparent film 22, and a liquid crystal material is filled between the formed two layers of ITO films 23 in order to constitute a liquid crystal layer 24. The five layers constitute the liquid crystal light adjustment film 14 as a whole. It should be noted that the liquid crystal light adjustment film 14 may be integrated with the touchscreen 11, or may be separate from the touchscreen 11 and finally bonded to the touchscreen 11. It should be noted that FIG. 3 shows only an example of a position relationship between the liquid crystal light adjustment film 14 and the touchscreen 11.

The drive circuit 15 on the foregoing circuit board 13 in FIG. 2 applies a control voltage to the liquid crystal light adjustment film 14. Optionally, the drive circuit 15 may determine, according to an actual operation condition of a terminal, a value of the control voltage to be applied to the liquid crystal light adjustment film 14. For example, the drive circuit 15 may determine, according to a switching signal generated inside the terminal, the value of the control voltage to be applied to the liquid crystal light adjustment film 14, or may determine, according to an instruction from a processor of the terminal, the value of the control voltage to be applied to the liquid crystal light adjustment film 14. Optionally, the control voltage may be a direct current voltage, or may be an alternating current voltage.

Optionally, when the display screen 12 of the terminal is working, the drive circuit 15 applies, to the liquid crystal light adjustment film 14, a control voltage whose amplitude is greater than or equal to a preset threshold, and in particular the drive circuit 15 applies the control voltage to the two layers of ITO films 23 of the liquid crystal light adjustment film 14. According to the structure of the liquid crystal light adjustment film 14 shown in FIG. 3, when the amplitude of the control voltage applied to upper and lower layers of the ITO films 23 is greater than or equal to the preset threshold, liquid crystal molecules in the liquid crystal layer 24 of the liquid crystal light adjustment film 14 are regularly arranged along an electric field direction of the control voltage such that light can penetrate. Therefore, the liquid crystal light adjustment film 14 is in a transparent state. In this case, an appearance of the terminal is the same as that of an existing terminal in use. When the display screen 12 of the terminal is not working, the drive circuit 15 applies, to the liquid crystal light adjustment film 14, a control voltage whose amplitude is less than the preset threshold. According to the structure of the liquid crystal light adjustment film 14 shown in FIG. 3, when the amplitude of the control voltage applied to the upper and lower layers of the ITO films 23 is less than the preset threshold, liquid crystal molecules in the liquid crystal layer 24 of the liquid crystal light adjustment film 14 are irregularly arranged such that light is scattered by the liquid crystal molecules that are irregularly arranged. Therefore, the liquid crystal light adjustment film 14 is in a non-transparent state, and a color of the liquid crystal light adjustment film 14 in the non-transparent state is different from a color of the display screen 12. Optionally, the appearance color of the liquid crystal light adjustment film 14 in the non-transparent state is white. Therefore, if the white mobile phone shown in FIG. 1 is used as an example, when the liquid crystal light adjustment film 14 is in the non-transparent state, the appearance color of the touchscreen 11 is white, because the touchscreen 11 is located above the display screen 12, from a perspective of a user, the appearance color of the display screen 12 is white, that is, when the display screen 12 of the white mobile phone is not working, an appearance color of the entire front housing of the terminal is white, thereby meeting a terminal appearance requirement of the user and improving visual experience of the user. It should be noted that this embodiment of the present disclosure imposes no limitation on the color of the housing of the terminal. If the housing of the terminal is of another color, when the display screen 12 of the terminal provided in this embodiment of the present disclosure is not working, the appearance color of the display screen 12 is different from that of a display screen that is not working in other approaches, thereby also improving visual experience of the user.

According to the color-variable terminal provided in this embodiment of the present disclosure, a liquid crystal light adjustment film matching a touchscreen is disposed on the touchscreen. A drive circuit applies a control voltage to the liquid crystal light adjustment film, and the liquid crystal light adjustment film is in a transparent state when an amplitude of the applied control voltage is greater than or equal to a preset threshold, or the liquid crystal light adjustment film is in a non-transparent state when an amplitude of the applied control voltage is less than the preset threshold. Therefore, when a display screen of the terminal is not working, an appearance color of the display screen is different from that of a display screen that is not working in other approaches, thereby meeting a terminal appearance requirement of a user and improving visual experience of the user.

Figure 4:
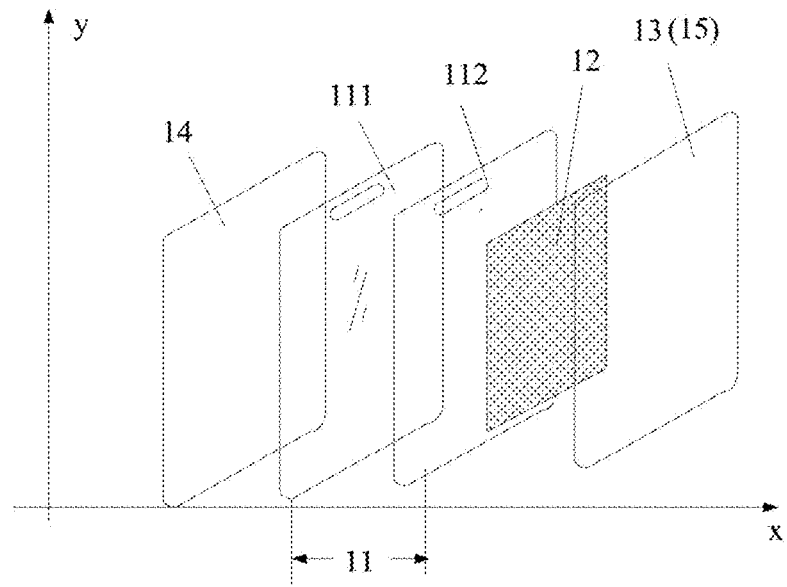
FIG. 4 is a schematic structural diagram of a color-variable terminal according to another embodiment of the present disclosure.

As shown in FIG. 4, the foregoing touchscreen 11 may include a glass cover 111 and a touch function layer 112. Optionally, the foregoing liquid crystal light adjustment film 14 may be disposed on an upper surface of the glass cover 111, that is, the liquid crystal light adjustment film 14 is coated or sputtered on the upper surface of the glass cover 111 as a separate layer.

Figure 5:
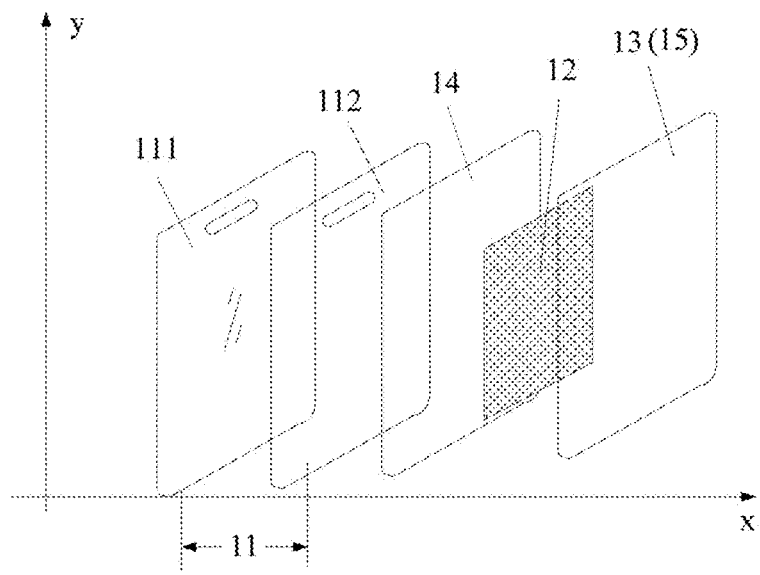
FIG. 5 is a schematic structural diagram of a color-variable terminal according to another embodiment of the present disclosure.

Optionally, as shown in FIG. 5, the foregoing liquid crystal light adjustment film 14 may also be disposed on a lower surface of the touch function layer 112, that is, the liquid crystal light adjustment film 14 is coated or sputtered on the lower surface of the touch function layer 112 as a separate layer.

Figure 6:
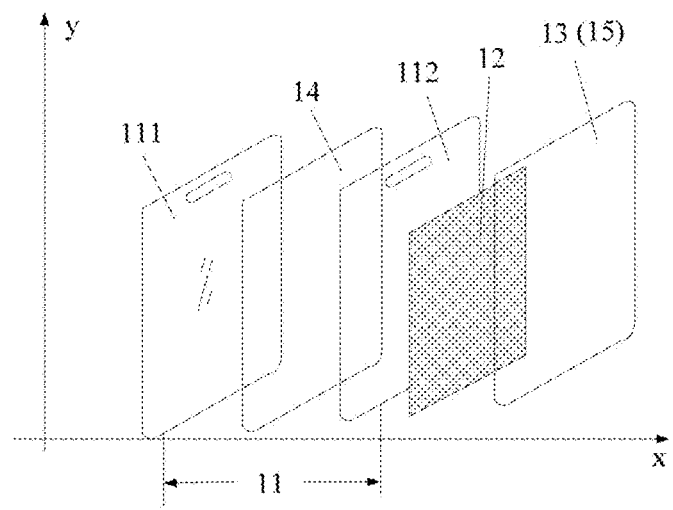
FIG. 6 is a schematic structural diagram of a color-variable terminal according to another embodiment of the present disclosure.
Figure 7:
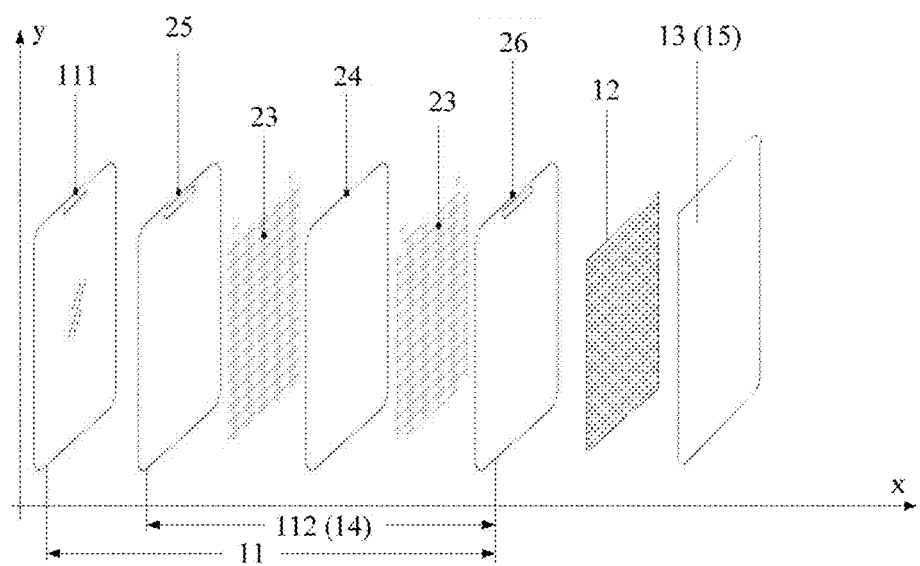
FIG. 7 is a schematic structural diagram of a color-variable terminal according to another embodiment of the present disclosure.

Optionally, shown in FIG. 6, the liquid crystal light adjustment film 14 may also be disposed between the glass cover 111 and the touch function layer 112. Optionally, the liquid crystal light adjustment film 14 may be disposed between the glass cover 111 and the touch function layer 112 as a separate layer, and the liquid crystal light adjustment film 14 may also be integrated with the touchscreen 11. In the latter case, as shown in FIG. 7, the touch function layer 112 of the touchscreen 11 includes upper and lower touch sensing layers, where the upper touch sensing layer includes a third transparent film layer 25, where a material of the third transparent film layer 25 may be glass, plastics, or another material, and a layer of ITO film 23 is coated on a lower surface of the third transparent film layer 25, and the lower touch sensing layer includes a fourth transparent film 26, where a material of the fourth transparent film 26 may be glass, plastics, or another material, and a layer of ITO film 23 is coated on an upper surface of the fourth transparent film 26. Therefore, only a liquid crystal material needs to be filled between the two layers of ITO films 23, and then the liquid crystal light adjustment film 14 and the touchscreen 11 are integrated. That is, the foregoing third transparent film layer 25 is equivalent to the first transparent film 21 of the liquid crystal light adjustment film 14, the fourth transparent film 26 is equivalent to the second transparent film 22 of the liquid crystal light adjustment film 14, and the two layers of ITO films 23 of the touch sensing layer are equivalent to the two layers of ITO films 23 of the liquid crystal light adjustment film 14, that is, the liquid crystal light adjustment film 14 shares the transparent film and the ITO films 23 that are of the touch sensing layer.

Figure 8:
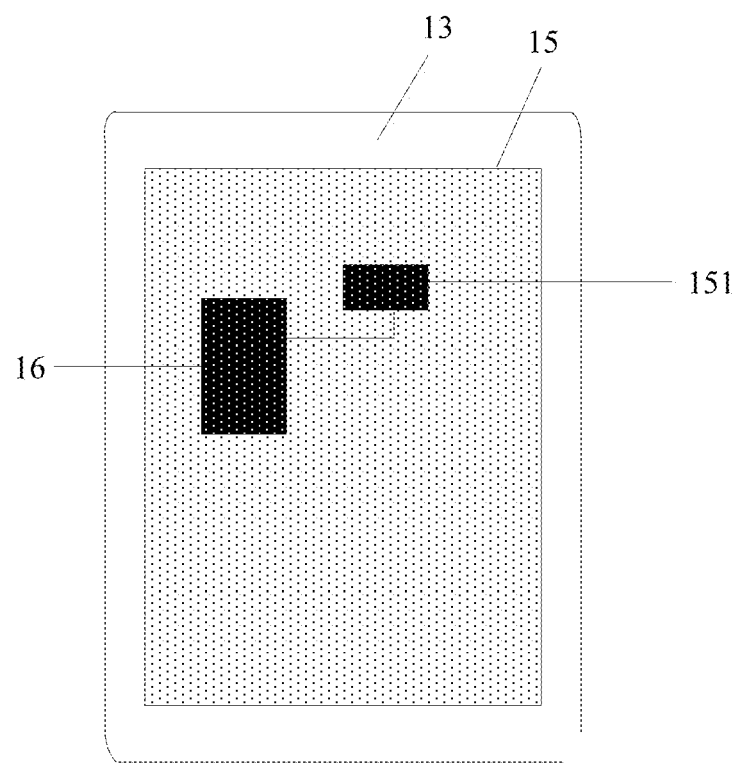
FIG. 8 is a schematic structural diagram of a circuit board according to the present disclosure.
Figure 9:
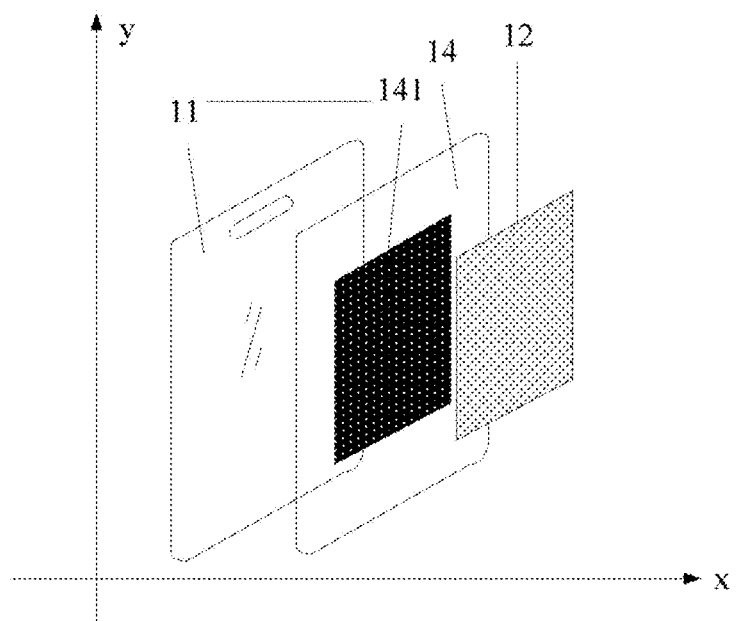
FIG. 9 is another schematic diagram of a liquid crystal light adjustment film according to the present disclosure.

Furthermore, as shown in FIGS. 8 and 9, the foregoing drive circuit 15 includes a first drive circuit 151, and the foregoing liquid crystal light adjustment film 14 includes a first area 141, where the first area 141 matches the display screen 12, and the first drive circuit 151 is configured to apply a control voltage to the first area 141. The foregoing circuit board 13 further includes a central processing unit 16, where the central processing unit 16 is configured to detect whether the display screen 12 is off. The central processing unit 16 is further configured to control the first drive circuit 151 to apply, to the first area 141, a control voltage whose amplitude is less than the preset threshold when it is detected that the display screen 12 is off, where the control voltage whose amplitude is less than the preset threshold enables the first area 141 to be in a non-transparent state, and the central processing unit 16 is further configured to control the first drive circuit 151 to apply, to the first area 141, a control voltage whose amplitude is greater than or equal to the preset threshold when it is detected that the display screen 12 is on, where the control voltage whose amplitude is greater than or equal to the preset threshold enables the first area 141 to be in a transparent state.

Further, the foregoing drive circuit 15 includes a first drive circuit 151, and reference may be made to a structure of the circuit board 13 shown in FIG. 8. The foregoing liquid crystal light adjustment film 14 includes a first area 141, where the first area 141 matches the display screen 12, for details, reference may be made to a structure of the liquid crystal light adjustment film 14 shown in FIG. 9. The first area may be implemented using an etching process. That is, an ITO pattern matching the display screen 12 is etched on the two layers of ITO films 23 on the foregoing liquid crystal light adjustment film 14, and the ITO pattern is the first area 141. A layer of ink is coated on another part, excluding the first area 141, on the ITO film 23 on an inner surface of the transparent film. For the white mobile phone shown in FIG. 1, a color of the ink is white.

When detecting that the display screen 12 is on, the central processing unit 16 controls the foregoing first drive circuit 151 to apply, to the first area 141, a control voltage whose amplitude is greater than or equal to the preset threshold, where the control voltage whose amplitude is greater than or equal to the preset threshold enables the first area 141 to be in the transparent state. In this case, an appearance of the terminal is the same as an appearance of an existing terminal in use.

Figure 10:
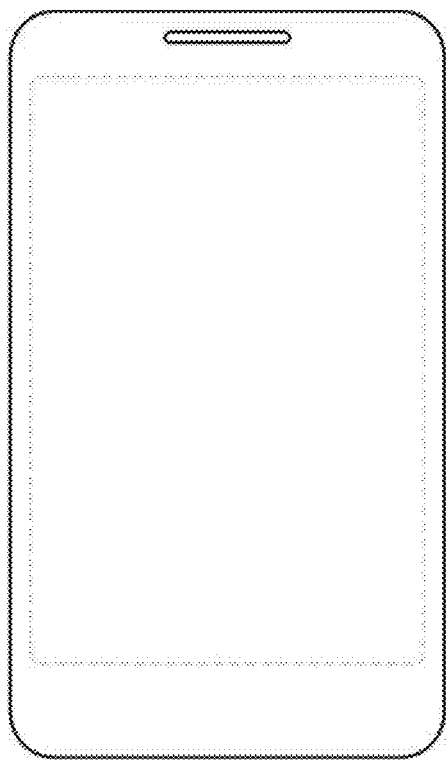
FIG. 10 is a white appearance effect diagram of a color-variable terminal according to the present disclosure.

When detecting that the display screen 12 is off, the central processing unit 16 controls the foregoing first drive circuit 151 to apply, to the first area 141, a control voltage whose amplitude is less than the preset threshold, where the control voltage whose amplitude is less than the preset threshold enables the first area 141 to be in the non-transparent state. A color of the first area 141 in the non-transparent state is different from a color of the display screen 12, and optionally, when the first area 141 is in the non-transparent state, an appearance color of the first area 141 may be white. Therefore, if the white mobile phone shown in FIG. 1 is used as an example, when the first area 141 is in the non-transparent state, the appearance color of the first area 141 is white. Because the touchscreen 11 is located above the display screen 12, from a perspective of a user, an appearance of the display screen 12 is also white, that is, when the display screen 12 of the white mobile phone is off, an appearance color of the entire front housing of the terminal is white, for details, reference may be made to a white appearance effect diagram of a terminal shown in FIG. 10, thereby meeting a terminal appearance requirement of the user and improving visual experience of the user. It should be noted that this embodiment of the present disclosure imposes no limitation on the color of the housing of the terminal. If the housing of the terminal is of another color, when the display screen 12 of the terminal provided in this embodiment of the present disclosure is off, the appearance color of the display screen 12 is different from that of a display screen that is off in other approaches, thereby also improving visual experience of the user.

It should be noted that FIG. 9 shows only an example of a position relationship between the liquid crystal light adjustment film 14 and the touchscreen 11. The technical solution in this embodiment of the present disclosure is applicable to positions of the liquid crystal light adjustment film 14 and the touchscreen 11 in any one of the terminal structures shown in the foregoing FIG. 4 to FIG. 7.

According to the color-variable terminal provided in this embodiment of the present disclosure, a liquid crystal light adjustment film 14 matching a touchscreen 11 is disposed on the touchscreen 11, and a first area 141 matching a display screen is etched on an ITO film layer 23 of the liquid crystal light adjustment film 14. When detecting that the display screen 12 is off, a central processing unit 16 controls a first drive circuit 151 to apply, to the first area 141, a control voltage whose amplitude is less than a preset threshold in order to enable the first area 141 to be in a non-transparent state. Therefore, when the display screen 12 of the terminal is off, an appearance color of the display screen 12 is different from an appearance color of the display screen that is off in other approaches, thereby meeting a terminal appearance requirement of a user and improving visual experience of the user.

Figure 11:
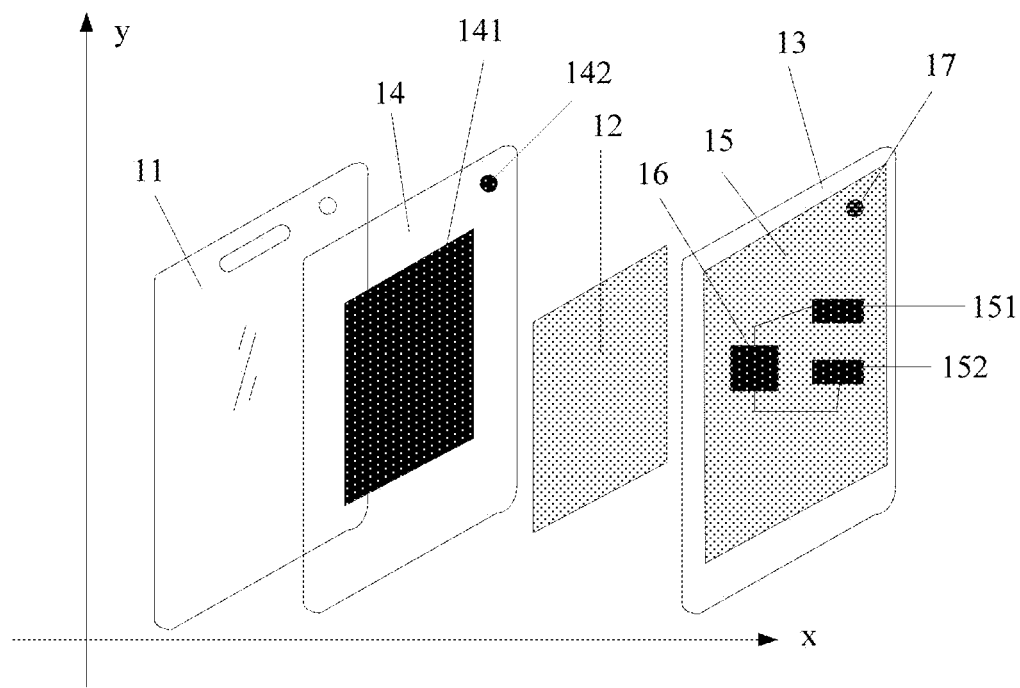
FIG. 11 is a schematic structural diagram of a color-variable terminal according to another embodiment of the present disclosure.

FIG. 11 is a schematic structural diagram of a color-variable terminal according to another embodiment of the present disclosure. On the basis of the foregoing embodiments, furthermore, as shown in FIG. 11, the foregoing terminal may further include a front-facing camera 17, where the front-facing camera 17 is disposed on the circuit board 13. The foregoing drive circuit 15 may further include a second drive circuit 152. For details, reference may be made to FIG. 11. The liquid crystal light adjustment film 14 further includes a second area 142, where the second area 142 matches the front-facing camera 17. The second drive circuit 152 is configured to apply a control voltage to the second area 142. The central processing unit 16 is further configured to receive an instruction used to turn on the front-facing camera 17, and control the second drive circuit 152 to apply, to the second area 142, a control voltage whose amplitude is greater than or equal to the preset threshold after it is detected that the display screen 12 is on, where the control voltage whose amplitude is greater than or equal to the preset threshold enables the second area 142 to be in a transparent state. The central processing unit 16 is further configured to control the second drive circuit 152 to apply, to the second area 142, a control voltage whose amplitude is less than the preset threshold when no instruction used to turn on the front-facing camera 17 is detected, where the control voltage whose amplitude is less than the preset threshold enables the second area 142 to be in a non-transparent state.

Further, as shown in FIG. 11, the foregoing drive circuit 15 may further include a second drive circuit 152, in addition to the first area 141, the foregoing liquid crystal light adjustment film 14 may further include a second area 142, where the second area 142 matches the front-facing camera 17. The second area 142 may be implemented using an etching process. That is, an ITO pattern matching the front-facing camera 17 is etched on the two layers of ITO films 23 on the foregoing liquid crystal light adjustment film 14, and the ITO pattern is the second area 142. A layer of ink is coated on another part, excluding the first area 141 and the second area 142, on the ITO film 23 on an inner surface of the transparent film, for the white mobile phone shown in FIG. 1, a color of the ink is white.

After detecting that the display screen 12 is on, the central processing unit 16 receives an instruction to turn on the front-facing camera 17 sent by the terminal. Optionally, the central processing unit 16 may determine whether the instruction used to turn on the front-facing camera 17 is received by detecting whether a level value of a pin voltage of the central processing unit 16 changes. When receiving the instruction used to turn on the front-facing camera 17, the central processing unit 16 controls the foregoing second drive circuit 152 to apply, to the second area 142, a control voltage whose amplitude is greater than or equal to the preset threshold, where the control voltage whose amplitude is greater than or equal to the preset threshold enables the second area 142 to be in the transparent state. In this case, an appearance of the terminal is the same as an appearance of an existing terminal in use.

Figure 12:
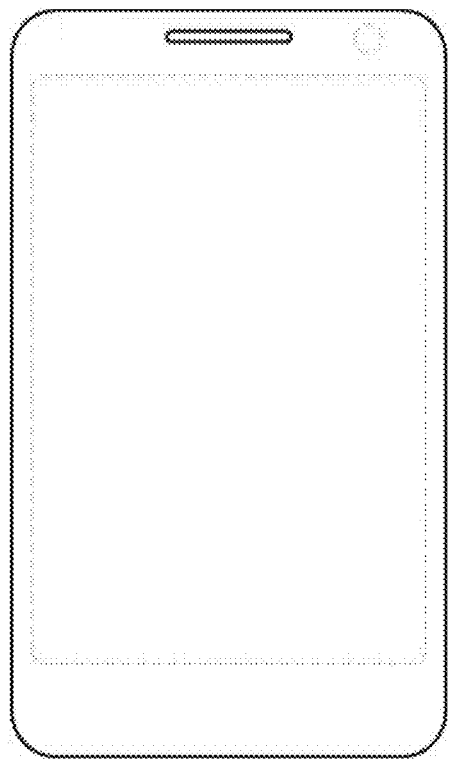
FIG. 12 is another white appearance effect diagram of a color-variable terminal according to the present disclosure.

When no instruction used to turn on the front-facing camera 17 is detected, the central processing unit 16 controls the foregoing second drive circuit 152 to apply, to the second area 142, a control voltage whose amplitude is less than the preset threshold, where the control voltage whose amplitude is less than the preset threshold enables the second area 142 to be in the non-transparent state. Optionally, when the second area 142 is in the non-transparent state, an appearance color of the second area 142 may be white. Therefore, if the white mobile phone shown in FIG. 1 is used as an example, a transparent area is disposed at a position opposite to the front-facing camera 17 and that is on the touchscreen 11. In other approaches, when the front-facing camera is off, from a perspective of a user, an appearance color of the transparent area is black. However, in this embodiment of the present disclosure, the second area 142 is actually opposite to the position of the transparent area, and the second area 142 and the transparent area are of a same shape and a same size, therefore, when the second area 142 is in the non-transparent state, from the perspective of the user, the appearance color of the transparent area is white. Furthermore, when the front-facing camera 17 of the white mobile phone is off and the display screen 12 is off, an appearance color of the entire front housing of the terminal is white, and for details, reference may be made to a white appearance effect diagram of a terminal shown in FIG. 12, thereby meeting a terminal appearance requirement of the user and improving visual experience of the user. It should be noted that this embodiment of the present disclosure imposes no limitation on the color of the housing of the terminal. If the housing of the terminal is of another color, when the front-facing camera 17 of the terminal provided in this embodiment of the present disclosure is off, an appearance color of a transparent area that is opposite to the front-facing camera 17 and that is on the touchscreen 11 is different from a color of the transparent area when the front-facing camera is off in the other approaches, thereby also improving visual experience of the user.

It should be noted that FIG. 11 shows only an example of a position relationship between the liquid crystal light adjustment film 14 and the touchscreen 11. The technical solution in this embodiment of the present disclosure is applicable to positions of the liquid crystal light adjustment film 14 and the touchscreen 11 that are in any one of the terminal structures shown in the foregoing FIG. 4 to FIG. 7.

According to the color-variable terminal provided in this embodiment of the present disclosure, a liquid crystal light adjustment film 14 matching a touchscreen 11 is disposed on the touchscreen 11, and a second area 142 matching a front-facing camera 17 is etched on an ITO film layer 23 of the liquid crystal light adjustment film 14, when no instruction used to turn on the front-facing camera 17 is detected, a central processing unit 16 controls a second drive circuit 152 to apply, to the second area 142, a control voltage whose amplitude is less than a preset threshold in order to enable the second area 142 to be in a non-transparent state. Therefore, when the front-facing camera 17 of the terminal is off, an appearance color of a transparent area opposite to the front-facing camera 17 and that is on the touchscreen 11 is different from an appearance color of the transparent area when the front-facing camera is off in other approaches, thereby meeting a terminal appearance requirement of a user and improving visual experience of the user.

Figure 13:
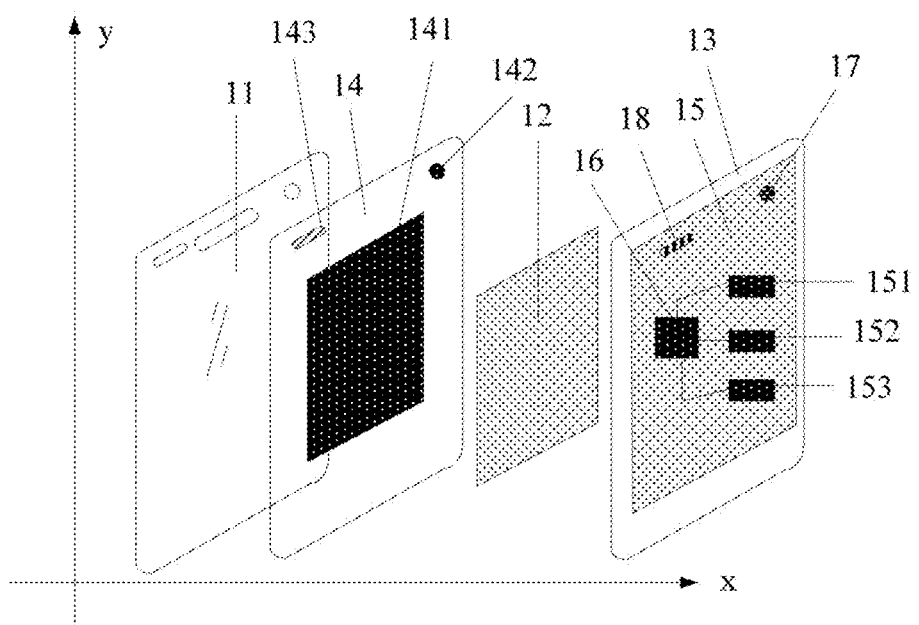
FIG. 13 is a schematic structural diagram of a color-variable terminal according to another embodiment of the present disclosure.

FIG. 13 is a schematic structural diagram of a color-variable terminal according to another embodiment of the present disclosure. On the basis of the foregoing embodiments, furthermore, as shown in FIG. 13, the foregoing terminal may further include a light sensor 18, where the light sensor 18 is disposed on the circuit board 13. The drive circuit 15 further includes a third drive circuit 153, and the liquid crystal light adjustment film 14 further includes a third area 143, where the third area 143 matches the light sensor 18, and the third drive circuit 153 is configured to apply a control voltage to the third area 143. The central processing unit 16 is further configured to receive an instruction used to turn on the light sensor 18, and control the third drive circuit 153 to apply, to the third area 143, a control voltage whose amplitude is greater than or equal to the preset threshold after it is detected that the display screen 12 is on, where the control voltage whose amplitude is greater than or equal to the preset threshold enables the third area 143 to be in a transparent state, and the central processing unit 16 is further configured to control the third drive circuit 153 to apply, to the third area 143, a control voltage whose amplitude is less than the preset threshold when no instruction used to turn on the light sensor 18 is detected, where the control voltage whose amplitude is less than the preset threshold enables the third area 143 to be in a non-transparent state.

Further, as shown in FIG. 13, the foregoing drive circuit 15 may further include a third drive circuit 153, in addition to the first area 141 and the second area 142, the foregoing liquid crystal light adjustment film 14 may further include a third area 143, where the third area 143 matches the light sensor 18. The third area 143 may be implemented using an etching process. That is, an ITO pattern matching the light sensor 18 is etched on the two layers of ITO films 23 on the foregoing liquid crystal light adjustment film 14, and the ITO pattern is the third area 143. A layer of ink is coated on another part, excluding the first area 141, the second area 142, and the third area 143, on the ITO film 23 on an inner surface of the transparent film. For the white mobile phone shown in FIG. 1, a color of the ink is white.

After detecting that the display screen 12 is on, the central processing unit 16 receives an instruction to turn on the light sensor 18 and that is sent by the terminal. Optionally, the central processing unit 16 may determine whether the instruction to turn on the light sensor 18 is received by detecting whether a level value of a pin voltage of the central processing unit 16 changes. When receiving the instruction used to turn on the light sensor 18, the central processing unit 16 controls the foregoing third drive circuit 153 to apply, to the third area 143, a control voltage whose amplitude is greater than or equal to the preset threshold, where the control voltage whose amplitude is greater than or equal to the preset threshold enables the third area 143 to be in the transparent state. In this case, an appearance of the terminal is the same as an appearance of an existing terminal in use.

Figure 14:
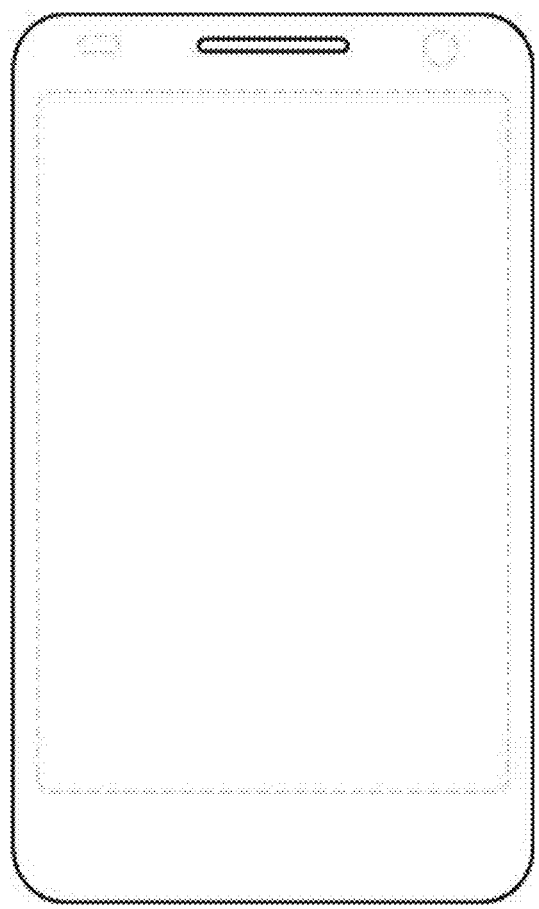
FIG. 14 is another white appearance effect diagram of a color-variable terminal according to the present disclosure.

When no instruction used to turn on the light sensor 18 is detected, the central processing unit 16 controls the foregoing third drive circuit 153 to apply, to the third area 143, a control voltage whose amplitude is less than the preset threshold, where the control voltage whose amplitude is less than the preset threshold enables the third area 143 to be in the non-transparent state. Optionally, when the third area 143 is in the non-transparent state, an appearance color of the third area 143 may be white. Therefore, if the white mobile phone shown in FIG. 1 is used as an example, a transparent area is disposed at a position opposite to the light sensor 18 on the touchscreen 11. In other approaches, when the light sensor is off, from a perspective of a user, an appearance color of the transparent area is black. However, in this embodiment of the present disclosure, the third area 143 is actually opposite to the position of the transparent area, and the third area 143 and the transparent area are of a same shape and a same size, therefore, when the third area 143 is in the non-transparent state, from the perspective of the user, the appearance color of the transparent area is white. Furthermore, when both the light sensor 18 and the front-facing camera 17 of the white mobile phone are off, and the display screen 12 is off, an appearance color of the entire front housing of the terminal is white, and for details, reference may be made to a white appearance effect diagram of a terminal shown in FIG. 14, thereby meeting a terminal appearance requirement of the user and improving visual experience of the user. It should be noted that this embodiment of the present disclosure imposes no limitation on the color of the housing of the terminal. If the housing of the terminal is of another color, when the light sensor 18 of the terminal provided in this embodiment of the present disclosure is off, an appearance color of a transparent area opposite to the light sensor 18 and on the touchscreen 11 is different from a color of the transparent area when the light sensor is off in other approaches, thereby also improving visual experience of the user.

It should be noted that FIG. 13 shows only an example of a position relationship between the liquid crystal light adjustment film 14 and the touchscreen 11. The technical solution in this embodiment of the present disclosure is applicable to positions of the liquid crystal light adjustment film 14 and the touchscreen 11 that are in any one of the terminal structures shown in the foregoing FIG. 4 to FIG. 7. In addition, the terminal shown in FIG. 13 that includes a display screen 12, a front-facing camera 17, and a light sensor 18 is only an example. A structure in which a terminal includes only a display screen 12 and a light sensor 18 is not shown, but an implementation principle is similar to that of the embodiment shown in FIG. 13, and details are not described herein.

According to the color-variable terminal provided in this embodiment of the present disclosure, a liquid crystal light adjustment film 14 matching a touchscreen 11 is disposed on the touchscreen 11, and a third area 143 matching a light sensor 18 is etched on an ITO film layer 23 of the liquid crystal light adjustment film 14. A central processing unit 16 controls a third drive circuit 153 to apply, to the third area 143, a control voltage whose amplitude is less than a preset threshold in order to enable the third area 143 to be in a non-transparent state when no instruction used to turn on the light sensor 18 is detected. Therefore, when the light sensor 18 of the terminal is off, an appearance color of a transparent area opposite to the light sensor 18 and on the touchscreen 11 is different from an appearance color of the transparent area when the light sensor is off in other approaches, thereby meeting a terminal appearance requirement of a user and improving visual experience of the user.

Figure 15:
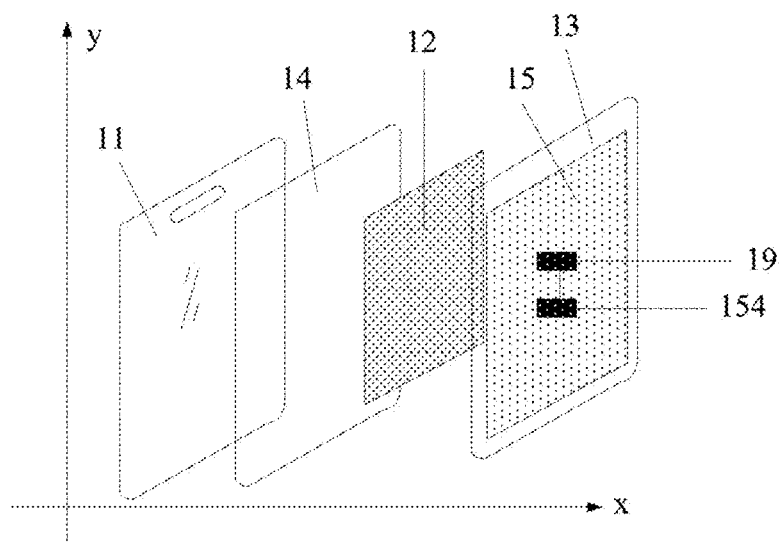
FIG. 15 is a schematic structural diagram of a color-variable terminal according to another embodiment of the present disclosure.

FIG. 15 is a schematic structural diagram of a color-variable terminal according to another embodiment of the present disclosure. On the basis of the foregoing embodiments shown in FIG. 1 to FIG. 7, furthermore, the foregoing terminal may further include a switch 19 configured to receive user input in order to generate a control signal to turn on or turn off the display screen 12. The circuit board 13 further includes a fourth drive circuit 154 configured to control, according to the control signal generated by the switch 19, the display screen 12 to turn on or turn off, where the fourth drive circuit 154 is electrically connected to the switch 19. The fourth drive circuit 154 applies, to the liquid crystal light adjustment film 14, a control voltage whose amplitude is greater than or equal to the preset threshold when the switch 19 generates a control signal that is used to control the display screen 12 to turn on, and the fourth drive circuit 154 applies, to the liquid crystal light adjustment film 14, a control voltage whose amplitude is less than the preset threshold when the switch 19 generates a control signal to control the display screen 12 to turn off.

Further, when receiving the user input, the switch 19 disposed on the terminal generates a control signal to control the display screen 12 to turn on or turn off, and transmits the control signal to the fourth drive circuit 154. The fourth drive circuit 154 controls the display screen 12 to turn on or turn off when receiving the control signal.

When the control signal is used to turn on the display screen 12, the fourth drive circuit 154 applies, to the liquid crystal light adjustment film 14, a control voltage whose amplitude is greater than or equal to the preset threshold. Therefore, the liquid crystal light adjustment film 14 on the touchscreen 11 is in the transparent state. In this case, an appearance of the terminal is the same as an appearance of an existing terminal in use.

When the control signal is used to turn off the display screen 12, the fourth drive circuit 154 applies, to the liquid crystal light adjustment film 14, a control voltage whose amplitude is less than the preset threshold. Therefore, the liquid crystal light adjustment film 14 is in the non-transparent state, a color of the liquid crystal light adjustment film 14 in the non-transparent state is different from a color of the display screen 12, and optionally, when the liquid crystal light adjustment film 14 is in the non-transparent state, an appearance color of the liquid crystal light adjustment film 14 is white. Therefore, if the white mobile phone shown in FIG. 1 is used as an example, when the liquid crystal light adjustment film 14 is in the non-transparent state, the appearance color of the touchscreen 11 is white, because the touchscreen 11 is located above the display screen 12, from a perspective of a user, the appearance color of the display screen 12 is white, that is, when the display screen 12 of the white mobile phone is off, an appearance color of the entire front housing of the terminal is white, thereby meeting a terminal appearance requirement of the user and improving visual experience of the user. It should be noted that this embodiment of the present disclosure imposes no limitation on the color of the housing of the terminal. If the housing of the terminal is of another color, when the display screen 12 of the terminal provided in this embodiment of the present disclosure is off, the appearance color of the display screen 12 is different from that of a display screen that is off in other approaches, thereby also improving visual experience of the user.

It should be noted that FIG. 15 shows only an example of a position relationship between the liquid crystal light adjustment film 14 and the touchscreen 11. The technical solution in this embodiment of the present disclosure is applicable to positions of the liquid crystal light adjustment film 14 and the touchscreen 11 in any one of the terminal structures shown in the foregoing FIG. 4 to FIG. 7.

According to the color-variable terminal provided in this embodiment of the present disclosure, a switch 19 to control a display screen 12 to turn on or turn off is disposed on the terminal, and the switch 19 is electrically connected to a fourth drive circuit 154. The fourth drive circuit 154 applies, to a liquid crystal light adjustment film 14, a control voltage that is less than a preset threshold when a control signal generated by the foregoing switch 19 to control the display 12 to turn off such that the liquid crystal light adjustment film 14 is in a non-transparent state. Therefore, when a display screen 12 of the terminal is off, an appearance color of the display screen 12 is different from that of a display screen that is off in other approaches, thereby meeting a terminal appearance requirement of a user and improving visual experience of the user.

Figure 16:
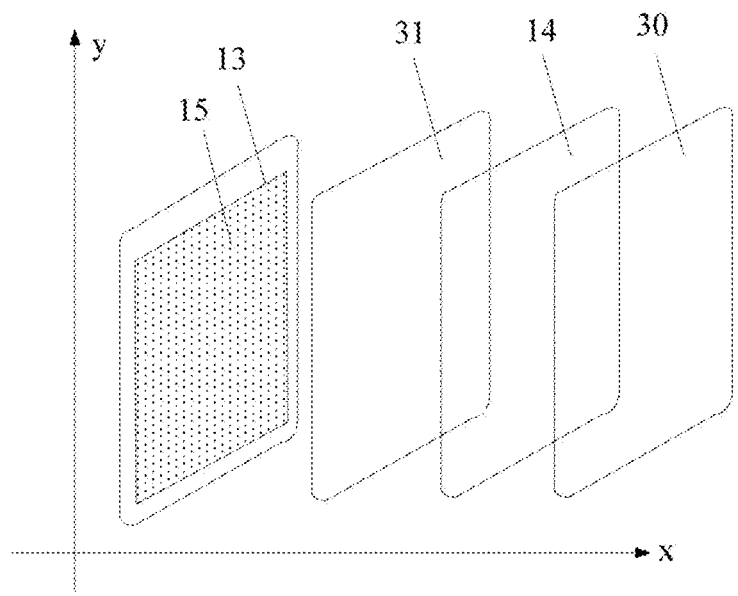
FIG. 16 is a schematic structural diagram of a color-variable terminal according to another embodiment of the present disclosure.

FIG. 16 is a schematic structural diagram of a color-variable terminal according to another embodiment of the present disclosure. As shown in FIG. 16, the terminal includes a housing 30, where the housing 30 is partially or entirely transparent, a circuit board 13, where the circuit board 13 is located inside the housing 30, and the circuit board 13 includes a drive circuit 15, a liquid crystal light adjustment film 14, where the liquid crystal light adjustment film 14 is located inside the housing 30 and covers a transparent area of the housing 30, and a coating 31, where the coating 31 is located inside the housing 30, and the coating 31 and the transparent area of the housing 30 are respectively located on two sides of the liquid crystal light adjustment film 14. The drive circuit 15 is configured to apply a control voltage to the liquid crystal light adjustment film 14. The liquid crystal light adjustment film 14 is in a transparent state when an amplitude of the control voltage is greater than or equal to a preset threshold, or the liquid crystal light adjustment film 14 is in a non-transparent state when an amplitude of the control voltage is less than the preset threshold, and a color of the liquid crystal light adjustment film 14 in the non-transparent state is different from a color of the coating 31.

Further, the housing 30 of the terminal in this embodiment of the present disclosure is entirely transparent or partially transparent, and the housing 30 may be a rear housing of the terminal or a housing surrounding four sides of a body of the terminal. The liquid crystal light adjustment film 14 is disposed inside the housing 30, and for a structure of the liquid crystal light adjustment film 14, reference may be made to the structure shown in FIG. 3. The liquid crystal light adjustment film 14 covers a transparent area of the housing 30, the coating 31 is further disposed inside the housing 30, and the coating 31 and the transparent area of the housing 30 are respectively located on two sides of the liquid crystal light adjustment film 14. According to a coordinate system shown in FIG. 16, the liquid crystal light adjustment film 14 is disposed on a left side of the housing 30, and the coating 31 is disposed on a left side of the liquid crystal light adjustment film 14.

The drive circuit 15 on the foregoing circuit board 13 is used to apply a control voltage to the liquid crystal light adjustment film 14. Optionally, the drive circuit 15 may determine, according to an actual operation condition of a terminal, a value of the control voltage to be applied to the liquid crystal light adjustment film 14. For example, the drive circuit 15 may determine, according to a switching signal generated inside the terminal, the value of the control voltage to be applied to the liquid crystal light adjustment film 14, or may determine, according to an instruction from a processor of the terminal, the value of the control voltage to be applied to the liquid crystal light adjustment film 14, or the drive circuit 15 may determine the value of the control voltage by detecting a level of a device in a circuit. Optionally, the control voltage may be a direct current voltage, or may be an alternating current voltage.

When the drive circuit applies, to the liquid crystal light adjustment film 14, a control voltage whose amplitude is greater than or equal to a preset threshold, and in particular the drive circuit applies the control voltage to the two layers of ITO films 23 of the liquid crystal light adjustment film 14. According to the structure of the liquid crystal light adjustment film 14 shown in FIG. 3, when the amplitude of the control voltage applied to the upper and lower layers of the ITO films 23 is greater than or equal to the preset threshold, liquid crystal molecules in the liquid crystal layer 24 of the liquid crystal light adjustment film 14 are regularly arranged along an electric field direction of the control voltage such that light can penetrate. Therefore, the liquid crystal light adjustment film 14 is in a transparent state. In this case, an appearance color of the terminal of the coating 31 inside the housing 30.

When the drive circuit applies, to the liquid crystal light adjustment film 14, a control voltage whose amplitude is less than the preset threshold, according to the structure of the liquid crystal light adjustment film 14 shown in FIG. 3, when the amplitude of the control voltage applied to the upper and lower layers of the ITO films 23 is less than the preset threshold, liquid crystal molecules in the liquid crystal layer 24 of the liquid crystal light adjustment film 14 are irregularly arranged such that light is scattered by the liquid crystal molecules that are irregularly arranged. Therefore, the liquid crystal light adjustment film 14 is in a non-transparent state, and a color of the liquid crystal light adjustment film 14 in the non-transparent state is different from a color of the coating 31. Optionally, the appearance color of the liquid crystal light adjustment film 14 in the non-transparent state is white, that is, an appearance color of the transparent area of the entire housing 30 of the terminal is white. That is, according to the terminal provided in this embodiment of the present disclosure, a color of the housing 30 of the terminal may change between the color of the coating 31 and white at any time, thereby meeting a terminal appearance requirement of a user and improving visual experience of the user.

According to the color-variable terminal provided in this embodiment of the present disclosure, a liquid crystal light adjustment film 14 is disposed inside a housing 30 of the terminal, and the liquid crystal light adjustment film 14 is disposed between a coating 31 and the housing 30. A drive circuit 15 applies a control voltage to the liquid crystal light adjustment film 14, and the liquid crystal light adjustment film 14 is in a transparent state when an amplitude of the applied control voltage is greater than or equal to a preset threshold, or the liquid crystal light adjustment film 14 is in a non-transparent state when an amplitude of the applied control voltage is less than the preset threshold. Therefore, the color of the housing 30 of the terminal may change at any time, thereby meeting a terminal appearance requirement of a user and improving visual experience of the user.

Figure 17:
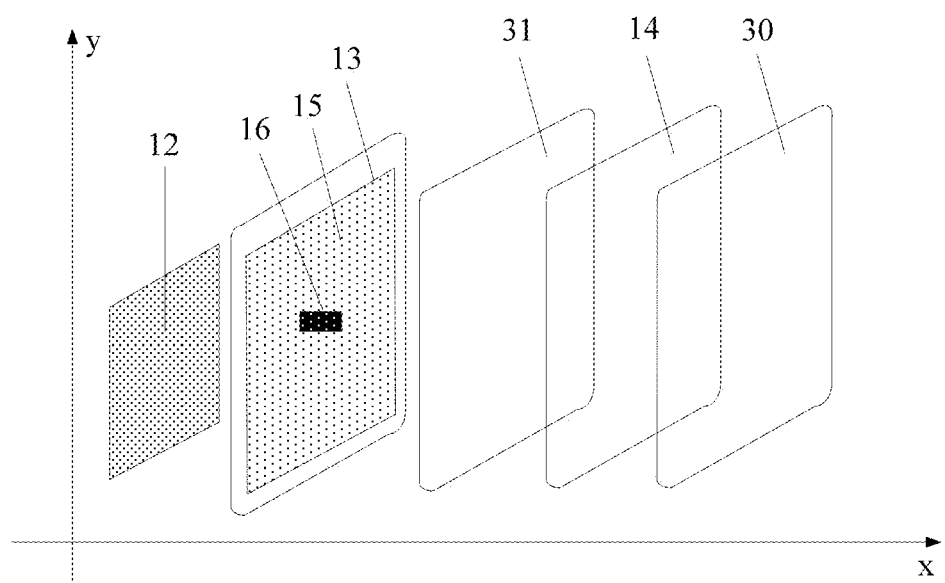
FIG. 17 is a schematic structural diagram of a color-variable terminal according to another embodiment of the present disclosure.

FIG. 17 is a schematic structural diagram of a color-variable terminal according to another embodiment of the present disclosure. On the basis of the embodiment shown in FIG. 16, the terminal may further include a display screen 12, and the foregoing circuit board 13 further includes a central processing unit 16.

As a possible implementation manner of this embodiment of the present disclosure, the terminal may, using the central processing unit 16, detect an on/off state of the display screen 12, and determine a value of a control voltage to be applied, by a drive circuit 15, to the liquid crystal light adjustment film 14. When the central processing unit 16 detects that the display screen 12 is off, the central processing unit 16 controls a drive circuit 15 to apply, to the liquid crystal light adjustment film 14, a control voltage whose amplitude is less than a preset threshold, where the control voltage whose amplitude is less than a preset threshold enables the liquid crystal light adjustment film 14 to be in a non-transparent state. When the central processing unit 16 detects that the display screen 12 is on, the central processing unit 16 controls the drive circuit 15 to apply, to a control voltage whose amplitude is greater than or equal to the preset threshold, to the liquid crystal light adjustment film 14, where the control voltage whose amplitude is greater than or equal to the preset threshold enables the liquid crystal light adjustment film 14 to be in a transparent state.

As another possible implementation manner of this embodiment of the present disclosure, the central processing unit 16 on the terminal may also control, according to a received input instruction of a user, the foregoing drive circuit 15 to apply a control voltage to the liquid crystal light adjustment film 14.

According to the color-variable terminal provided in this embodiment of the present disclosure, a liquid crystal light adjustment film 14 is disposed inside a housing 30 of the terminal, and the liquid crystal light adjustment film 14 is disposed between a coating 31 and the housing 30. A drive circuit 15 applies, under the control of a central processing unit 16, a control voltage to the liquid crystal light adjustment film 14, and the liquid crystal light adjustment film 14 is in a transparent state when an amplitude of the applied control voltage is greater than or equal to a preset threshold, or the liquid crystal light adjustment film 14 is in a non-transparent state when an amplitude of the applied control voltage is less than the preset threshold. Therefore, the color of the housing 30 of the terminal may change at any time, thereby meeting a terminal appearance requirement of a user and improving visual experience of the user.

A person of ordinary skill in the art may understand that all or some of the steps of the method embodiments may be implemented by a program instructing relevant hardware. The program may be stored in a computer readable storage medium. The steps of the method embodiments are performed when the program runs. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A color-variable terminal, comprising:
   a housing that is partially transparent or entirely transparent;
   a liquid crystal light adjustment film located inside the housing and covering a transparent area of the housing, the terminal being configured to apply a control voltage to the liquid crystal light adjustment film, the liquid crystal light adjustment film being in a transparent state when an amplitude of the control voltage is greater than or equal to a preset threshold, and the liquid crystal light adjustment film being in a non-transparent state when the amplitude of the control voltage is less than the preset threshold; and
   a coating located inside the housing, the coating and the transparent area of the housing are respectively located on two sides of the liquid crystal light adjustment film, a color of the liquid crystal light adjustment film in the non-transparent state being different from a color of the coating.

2. The terminal according to claim 1, wherein the terminal is configured to apply, to the liquid crystal light adjustment film, the control voltage when receiving an input instruction of a user.

3. The terminal according to claim 1, further comprising a display screen, the terminal being configured to apply, to the liquid crystal light adjustment film, the control voltage whose amplitude is less than the preset threshold when detecting that the display screen is off.

4. The terminal according to claim 1, further comprising a display screen, the terminal being configured to apply, to the liquid crystal light adjustment film, the control voltage whose amplitude is greater than or equal to the preset threshold when detecting that the display screen is on.

5. The terminal according to claim 1, wherein the color of the liquid crystal light adjustment film in the non-transparent state is a same color as a part of the housing that is non-transparent.

6. The terminal according to claim 1, wherein the housing comprises a rear housing of the terminal.

7. The terminal according to claim 1, wherein the housing comprises a housing surrounding four sides of a body of the terminal.

8. The terminal according to claim 1, wherein the color of the liquid crystal light adjustment film in the non-transparent state comprises white.

9. The terminal according to claim 1, wherein the terminal comprises a mobile phone.

10. A color-variable terminal, comprising:
    a touchscreen;
    a display screen located below the touch screen; and
    a liquid crystal light adjustment film disposed on the touchscreen, the terminal being configured to apply a control voltage to the liquid crystal light adjustment film, the liquid crystal light adjustment film being in a transparent state when an amplitude of the control voltage is greater than or equal to a preset threshold, the liquid crystal light adjustment film being in a non-transparent state when the amplitude of the control voltage is less than the preset threshold, and a color of the liquid crystal light adjustment film in the non-transparent state is a same color as a front housing of the terminal.

11. The terminal according to claim 10, wherein a color of a rear housing of the terminal is a same color as the front housing of the terminal, and a color of a side surface of a part coupling the front housing and the rear housing is the same color as the front housing of the terminal.

12. The terminal according to claim 10, wherein the color of the front housing comprises white.

13. The terminal according to claim 10, wherein the terminal is configured to apply the control voltage to the liquid crystal light adjustment film when receiving an input instruction of a user.

14. The terminal according to claim 10, wherein the liquid crystal light adjustment film comprises a first area, the first area matches the display screen, and the terminal is configured to apply, to the first area, the control voltage whose amplitude is less than the preset threshold when detecting that the display screen is off.

15. The terminal according to claim 10, wherein the liquid crystal light adjustment film comprises a first area, the first area matches the display screen, and the terminal is configured to apply, to the first area, the control voltage whose amplitude is greater than or equal to the preset threshold when detecting that the display screen is on.

16. The terminal according to claim 10, further comprising a front-facing camera, the liquid crystal light adjustment film comprising a second area, the second area matching the front-facing camera, and the terminal being configured to apply, to the second area, the control voltage whose amplitude is less than the preset threshold when detecting that the front-facing camera is turned off.

17. The terminal according to claim 10, further comprising a front-facing camera, the liquid crystal light adjustment film comprising a second area, the second area matching the front-facing camera, and the terminal being configured to apply, to the second area, the control voltage whose amplitude is greater than or equal to the preset threshold when detecting that the front-facing camera is turned on.

18. The terminal according to claim 10, further comprising a light sensor, the liquid crystal light adjustment film comprising a third area, the third area matching the light sensor, and the terminal being configured to apply, to the third area, the control voltage whose amplitude is less than the preset threshold when detecting that the light sensor is turned off.

19. The terminal according to claim 10, further comprising a light sensor, the liquid crystal light adjustment film comprising a third area, the third area matching the light sensor, and the terminal being configured to apply, to the third area, the control voltage whose amplitude is greater than or equal to the preset threshold when detecting that the light sensor is turned on.

20. The terminal according to claim 10, further comprising a front-facing camera and a light sensor, the liquid crystal light adjustment film matching the display screen, the front-facing camera, and the light sensor, and the terminal being configured to apply, to the liquid crystal light adjustment film, the control voltage whose amplitude is less than the preset threshold when detecting that the display screen is off, the front-facing camera is turned off, and the light sensor is turned off.

* * * * *